(12) United States Patent
Vanderzyden et al.

(10) Patent No.: US 10,014,758 B2
(45) Date of Patent: Jul. 3, 2018

(54) METHOD OF ASSEMBLING INTEGRATED DRIVE GENERATOR HOUSING AND BEARING

(71) Applicant: Hamilton Sundstrand Corporation, Windsor, CT (US)

(72) Inventors: Henry R. Vanderzyden, Byron, IL (US); Jonathan C. Dell, Carpentersville, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 224 days.

(21) Appl. No.: 14/806,764

(22) Filed: Jul. 23, 2015

(65) Prior Publication Data

US 2015/0333607 A1 Nov. 19, 2015

Related U.S. Application Data

(62) Division of application No. 13/542,776, filed on Jul. 6, 2012, now Pat. No. 9,154,011.

(51) Int. Cl.
*H02K 5/04* (2006.01)
*H02K 15/16* (2006.01)
*H02K 7/18* (2006.01)

(52) U.S. Cl.
CPC .............. *H02K 15/16* (2013.01); *H02K 5/04* (2013.01); *H02K 7/1823* (2013.01); *Y10T 29/49011* (2015.01)

(58) Field of Classification Search
CPC ... E21B 17/05; E21B 7/04; F16D 3/04; F16D 3/44; F16D 47/02; H02K 15/16; H02K 5/04; H02K 7/1823
See application file for complete search history.

(56) References Cited

U.S. PATENT DOCUMENTS

| | | | |
|---|---|---|---|
| 2,885,580 A | 5/1959 | Scanlon et al. | |
| 3,777,195 A * | 12/1973 | Potter | H02K 5/1732 310/91 |
| 4,055,778 A | 10/1977 | Binder | |
| 4,252,035 A | 2/1981 | Cordner et al. | |
| 4,609,842 A | 9/1986 | Aleem et al. | |
| 4,621,210 A | 11/1986 | Krinickas, Jr. | |
| 4,734,590 A | 3/1988 | Fluegel | |
| 5,073,039 A * | 12/1991 | Shervington | F16C 19/525 384/278 |
| 5,364,194 A * | 11/1994 | Lubin | F16C 25/083 384/215 |
| 6,040,647 A * | 3/2000 | Brown | H02K 1/185 29/596 |
| 6,048,179 A | 4/2000 | Forster | |
| 6,803,688 B2 | 10/2004 | Estrada et al. | |
| 6,851,267 B2 | 2/2005 | Bruno et al. | |
| 7,230,363 B2 | 6/2007 | Stout et al. | |
| 7,560,838 B2 | 7/2009 | Van Der Woude | |

(Continued)

*Primary Examiner* — Minh Trinh
(74) *Attorney, Agent, or Firm* — Carlson, Gaskey & Olds, P.C.

(57) ABSTRACT

A method of assembling an integrated drive generator includes the steps of providing a bore in a center housing portion, pressing a bearing liner into the bore, with a portion of the bearing liner extending proud of a surface of the center plate, and machining the surface around and adjacent to the bearing liner to provide a machined surface parallel to the surface.

9 Claims, 4 Drawing Sheets

(56) References Cited

U.S. PATENT DOCUMENTS

| | | | |
|---|---|---|---|
| 7,960,879 B2* | 6/2011 | Abousleiman | F02C 7/32 |
| | | | 310/400 |
| 8,094,006 B2* | 1/2012 | Davis | G01M 13/04 |
| | | | 322/44 |
| 9,154,011 B2* | 10/2015 | Vanderzyden | H02K 5/04 |
| 2003/0189382 A1* | 10/2003 | Tornquist | F16C 25/08 |
| | | | 310/90 |
| 2009/0118072 A1* | 5/2009 | Minke | F16D 9/06 |
| | | | 475/344 |
| 2010/0084933 A1 | 4/2010 | Ishikawa et al. | |
| 2010/0284836 A1* | 11/2010 | Grosskopf | F16C 17/22 |
| | | | 417/410.1 |

* cited by examiner

METHOD OF ASSEMBLING INTEGRATED DRIVE GENERATOR HOUSING AND BEARING

CROSS-REFERENCE TO RELATED APPLICATIONS

This disclosure is a continuation of U.S. patent application Ser. No. 13/542,776 filed Jul. 6, 2012, now issued as U.S. Pat. No. 9,154,011.

BACKGROUND

This disclosure relates to a housing for an integrated drive generator for a gas turbine engine, for example. The disclosure also relates to a mounting configuration for a hydraulic unit of the integrated drive generator relative to its housing.

One example type of integrated drive generator (IDG) includes a generator, a hydraulic unit and a differential assembly arranged in a common housing. The differential assembly is operatively coupled to a gas turbine engine via an input shaft. The rotational speed of the input shaft varies during the operation of the gas turbine engine. The hydraulic unit cooperates with the differential assembly to provide a constant speed to the generator throughout engine operation.

In one example, the housing includes generator, center and input housing portions, which may be constructed from a magnesium alloy. The hydraulic unit is mounted to the center housing portion, which is sealed relative to the generator and input housing portions with seal plates.

The center housing has spaced apart lateral sides. The hydraulic unit includes a structural can that is mounted to one of the sides. It can be difficult to maintain the flatness in a machined magnesium surface. The sides have been machined flat in the area of the hydraulic unit across the center housing portion in the area of the hydraulic unit and the surrounding surface, which maintains flatness of the center housing portion to ensure that it adequately seals relative to the other housing portions. A bearing liner is pressed into a bore in the center housing portion to support a hydraulic unit shaft. The bearing liner is flush with the lateral surface opposite the can. The surface is subsequently machined right over the bearing liner, better ensuring flatness.

SUMMARY

In one exemplary embodiment, a method of assembling an integrated drive generator includes the steps of providing a bore in a center housing portion, pressing a bearing liner into the bore, with a portion of the bearing liner extending proud of a surface of the center plate, and machining the surface around and adjacent to the bearing liner to provide a machined surface parallel to the surface.

In a further embodiment of the above, the method includes the step of installing a bearing onto a shaft, and inserting the bearing into the bearing liner.

In a further embodiment of any of the above, the method includes machining a recess in an opposite side of the center housing portion to provide a second machined surface, and securing a hydraulic unit to the second machined surface, the hydraulic unit having the shaft.

In a further embodiment of any of the above, the method includes arranging a seal on the machined surface and sealing the center housing portion relative to another housing portion with the seal plate.

In a further embodiment of any of the above, the method includes the steps of securing generator, center and input housing portions to one another. The center housing portion is sealed relative to the generator and input housing portions with seal plates. The center housing portion is arranged between the generator and input housing portions. The seal plates are arranged on opposing sides of and in engagement with the center housing portion. A hydraulic unit is mounted to the center housing portion. The center housing portion includes first and second parallel surfaces, and the machined surface is parallel to and recessed into one of the first and second surfaces in an area of the hydraulic unit.

In a further embodiment of any of the above, the method includes the steps of securing generator, center and input housing portions to one another. The center housing portion is sealed relative to the generator and input housing portions with seal plates. A hydraulic unit is mounted to the center housing portion. The center housing portion includes first and second parallel surfaces. The machined surface is parallel to and recessed into one of the first and second surfaces in an area of the hydraulic unit. The hydraulic unit includes a can having a flange secured to the machined surface. The can houses a shaft supported by a bore in the center housing portion.

In a further embodiment of any of the above, the can houses first and second pumping elements separated by a pump plate and configured to provide a fixed rotational speed to a generator within the housing.

In a further embodiment of any of the above, a first lateral thickness is provided between the first surface and the machined surface. A second lateral thickness is provided between the first and second surfaces. A ratio of the second lateral thickness to the first lateral thickness is 1.05.

In a further embodiment of any of the above, the hydraulic unit includes a shaft supported by a bearing in the center housing portion. The machined surface surrounds the bearing.

In a further embodiment of any of the above, the method includes the steps of securing generator, center and input housing portions to one another. The center housing portion is sealed relative to the generator and input housing portions with seal plates. A hydraulic unit is mounted to the center housing portion. The center housing portion includes first and second parallel surfaces. The machined surface is parallel to and recessed into one of the first and second surfaces in an area of the hydraulic unit. The hydraulic unit includes a shaft supported by a bearing in the center housing portion. The machined surface surrounds the bearing. The bearing includes a bearing liner extending proud of the machined surface.

In a further embodiment of any of the above, the bearing liner is in an interference fit in a bore in the center housing portion.

In a further embodiment of any of the above, the bearing liner includes first and second flanges opposite one another. The second flange engages the second surface. The first flange is proud of the first surface and engages the bearing.

In a further embodiment of any of the above, the bearing is a roller bearing.

In a further embodiment of any of the above, the machined surface may provide a lip circumscribing the bearing liner.

In a further embodiment of any of the above, the center housing portion is a magnesium alloy.

In a further embodiment of any of the above, the machined surface is provided by a milled surface.

BRIEF DESCRIPTION OF THE DRAWINGS

The disclosure can be further understood by reference to the following detailed description when considered in connection with the accompanying drawings wherein.

DETAILED DESCRIPTION

Figure 1:
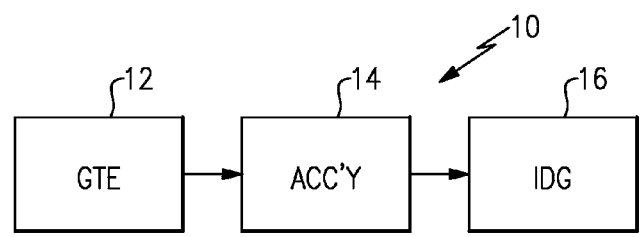
FIG. 1 is a highly schematic view of a generator system.

An example generator system 10 is schematically illustrated in FIG. 1. The system 10 includes a gas turbine engine 12 that provides rotational drive to an integrated drive generator (IDG) 16 through an accessory drive gearbox 14 mounted on the gas turbine engine 12. The accessory drive gearbox 14 is coupled to a spool of the engine 12, and the speed of the spool varies throughout engine operation.

Figure 2:
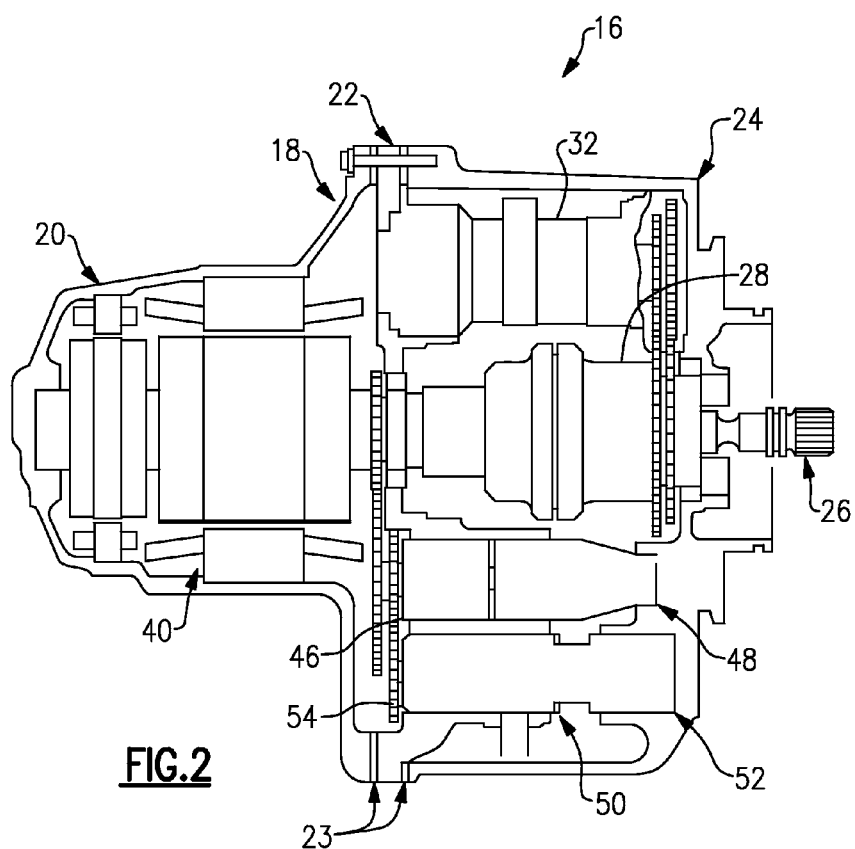
FIG. 2 is a cross-sectional schematic view of an example integrated drive generator.
Figure 3:
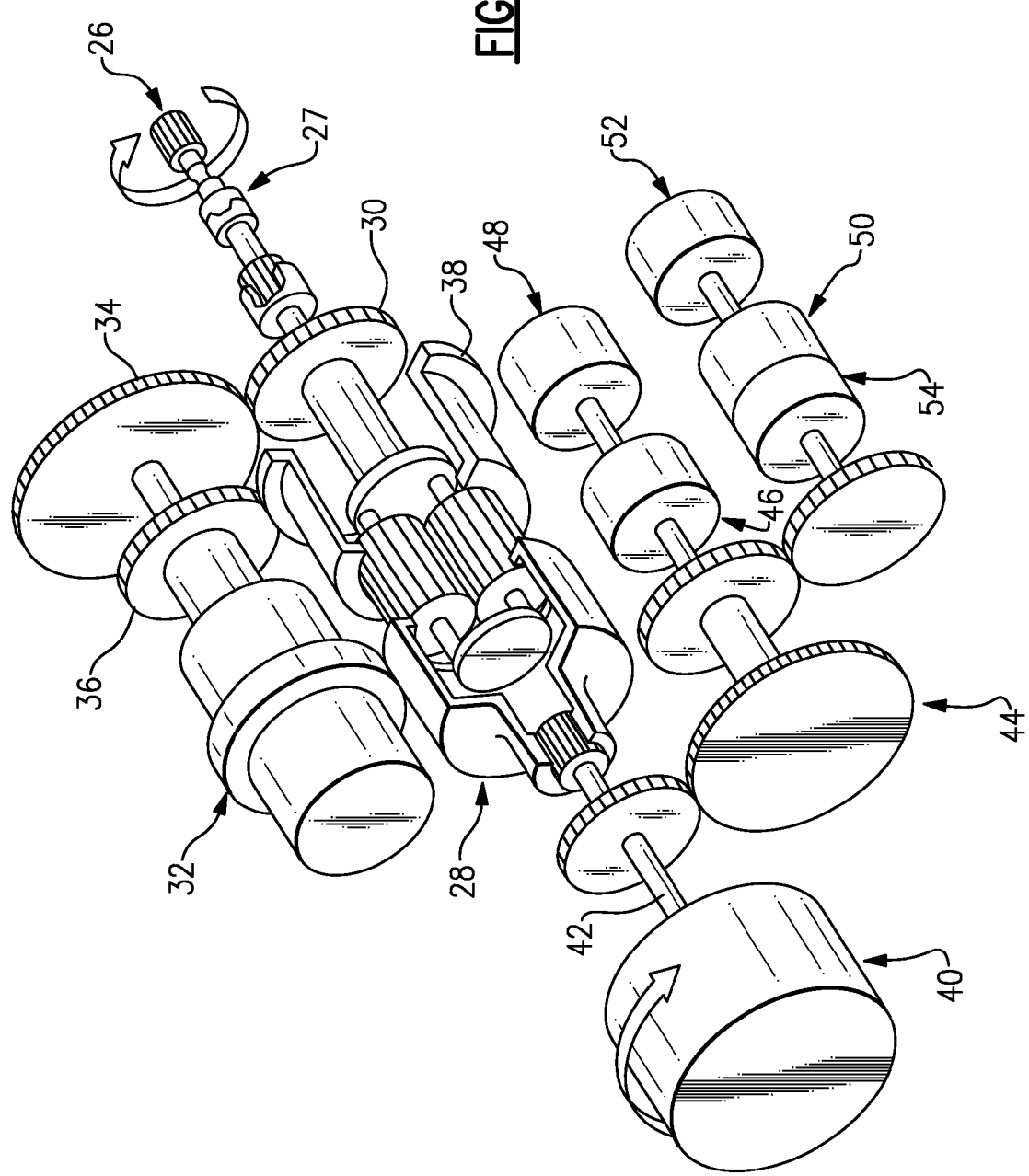
FIG. 3 is a schematic perspective view of a generator, a hydraulic unit and a differential assembly of the integrated drive generator shown in FIG. 2.

Referring to FIGS. 2 and 3, an example IDG 16 is illustrated. In the example, the IDG 16 includes a housing 18 having generator, center and input housing portions 20, 22, 24 secured to one another. A generator 40 is arranged in the generator housing portion 20. Seal plates 23 are provided on either side of the center housing 22 to seal the center housing 22 relative to the generator and input housing portions 20, 24.

An input shaft 26 receives rotational drive from the accessory drive gearbox 14. The rotational speed of the input shaft 26 varies depending upon the operation of the engine 12. To this end, as a result, a hydraulic unit 32 cooperates with the differential assembly 28 to convert the variable rotational speed from the input shaft 26 to provide a fixed rotational output speed to the generator 40.

The input shaft 26 rotationally drives a differential input gear 30 that is coupled to a hydraulic input gear 34 of the hydraulic unit 32. The differential input gear 30 is operatively coupled to the input shaft 26 by the disconnect assembly 27. The hydraulic output gear 36 is coupled to a differential speed trim gear 38. The hydraulic unit 32 increases or decreases the rotational speed provided to the differential unit 28 from the hydraulic input gear 34 to provide a fixed rotational output speed, such as a 12,000 rpm speed. The variable rotational speed of the differential input gear 30 combines with the speed of the differential speed trim gear 38 to provide a fixed rotational speed to a gear input shaft 42.

In the example, a gear train 44 cooperates with the generator input shaft 42, which rotates at a constant speed to rotationally drive a charge pump 46, deaerator 48, main scavenge pump 50, inversion pump 52 and generator scavenge pump 54. Thus, these components may be designed efficiently to operate at a fixed speed.

Figure 4:
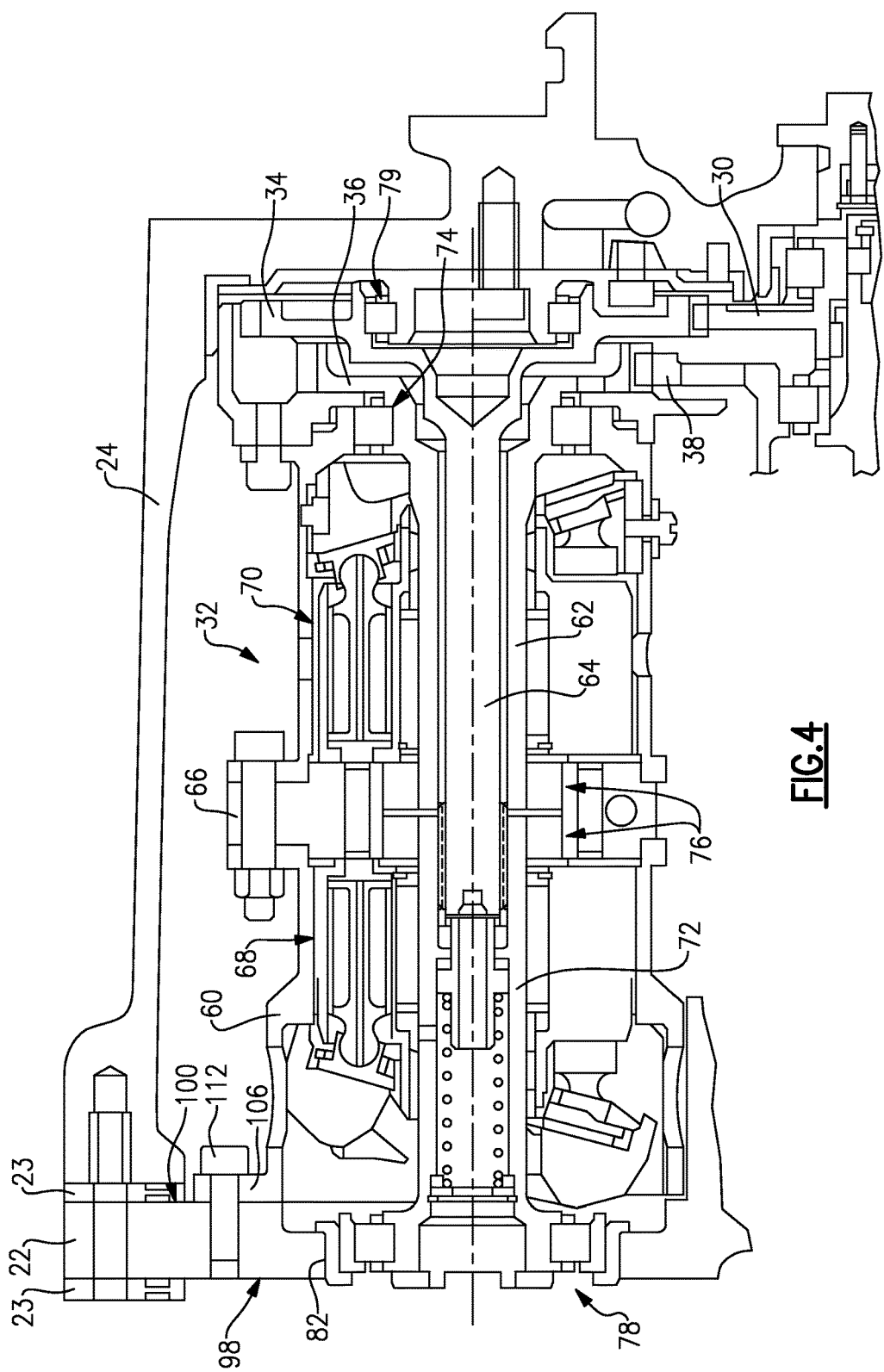
FIG. 4 is a cross-sectional view through the hydraulic unit.

Referring to FIG. 4, the hydraulic unit 32 includes a can 60 that houses and provides structural support for the hydraulic unit components. Fixed and variable speed shafts 62, 64 are arranged coaxially with and nested relative to one another on one side of the hydraulic unit 32. The hydraulic input gear 34 is provided by the variable speed shaft 64, and the hydraulic output gear 36 is provided by the trim speed shaft 62.

A speed change shaft 72 is also arranged within the can 60 and is coaxial with the trim and variable speed shafts 62, 64. A pump plate 66 separates first and second pumping assemblies 68, 70, which each include a wobbler and pistons. The pumping assemblies cooperate with one another to increase or decrease the rotational speed of the trim speed shaft 62.

A first bearing 74 supports the trim speed shaft 62 relative to the can 60, and a second bearing 76 supports the other end of the trim speed shaft 62 relative to the pump plate 66. Another second bearing 76 supports the speed change shaft 72 relative to the pump plate 66, and a third bearing 78 supports the other end of the speed change shaft 72 relative to the center housing 22. A fourth bearing 79 supports the variable speed shaft 64 relative to the input housing 24.

Figure 5:
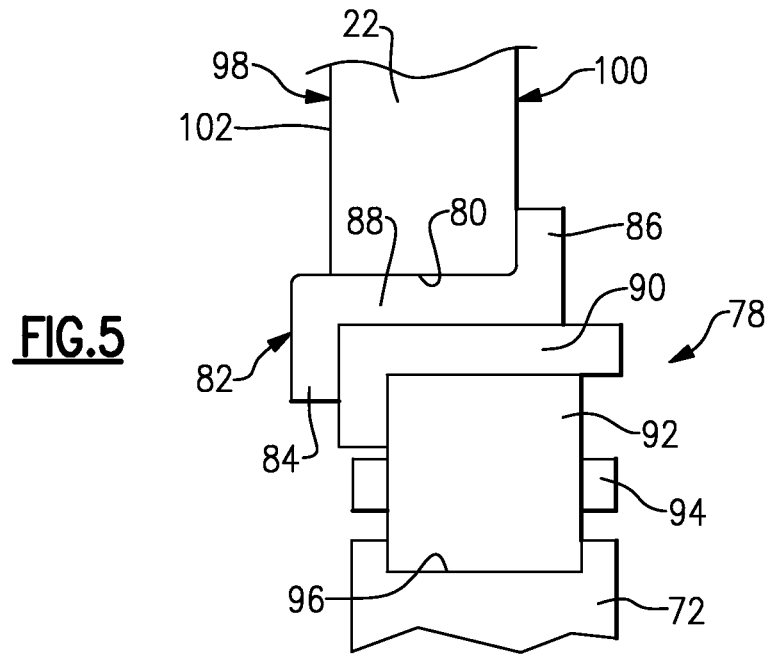
FIG. 5 is an enlarged cross-sectional view of in an area of a bearing supporting a hydraulic unit shaft relative to a center housing portion.
Figure 6:
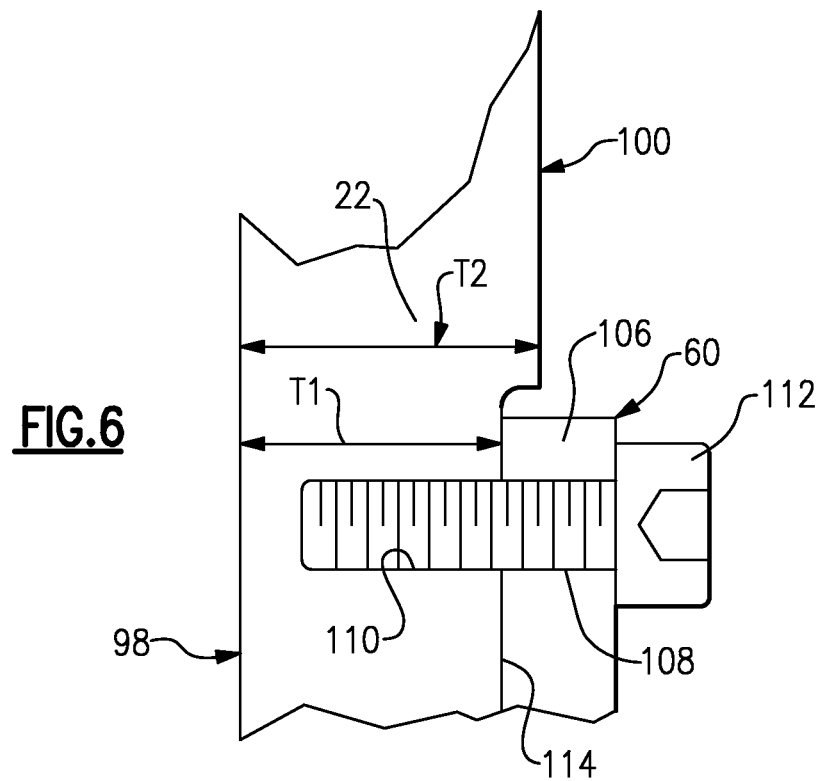
FIG. 6 is an enlarged cross-sectional view of the hydraulic unit mounted to the center housing portion.

Referring to FIGS. 4 and 5, the center housing portion 22 includes a bore 80 that receives the third bearing 78. A bearing liner 82, which may be steel, is press-fit into the bore 80. The bearing liner 82 includes first and second flanges 84, 86 adjoined by a wall 88 that is received in the bore 80 to provide the press-fit. It is desirable to press-fit the bearing liner 82 into the bore 80 prior to machining, since press-fitting may distort the magnesium center housing portion 22. The center housing portion 22 includes first and second surfaces 98, 100 that are laterally spaced apart from one another. The first and second surfaces 98, 100 may be provided by an initial machining operation that may provide sufficiently flat surfaces for adequate sealing of the seal plates 23. The second flange 86 abuts the second surface 100 to limit the installation depth of the bearing liner 82 during press-fitting.

The first flange 84 extends proud or beyond the first surface 98, which is necessary to accommodate the width of the third bearing 78. The third bearing 78 includes an outer race 90 received by the bearing liner 82 in abutting relationship with the first flange 84. Rollers 92 are spaced circumferentially about an inner race 96, which is provided by the speed change shaft 72, and engage the outer and inner races 90, 96. The circumferential spacing of rollers 92 are maintained by a cage 94.

The center housing portion 22 is machined to a thinner width than provided by the first and second surfaces 98, 100. This may enable a longer hydraulic unit to be accommodated in the same sized housing envelope as previously used IDGs. However, desired flatness of the center housing portion 22 must be maintained to ensure proper sealing of the center housing portion 22 relative to the generator and input housing portions 20, 24. To this end, the first surface 98 is machined, for example, using a milling operation, to provide a machined surface 102 that is parallel with the second surface 100. The bearing liner 82 is installed before machining.

The can 60 includes a flange 106 that is secured to the center housing portion 22. The flange 106 includes holes 108 aligned with holes 110 in the center housing portion 22. Fasteners 112 are received by the holes 108, 110 and secure the flange 106 to the center housing portion 22. A machined surface 114, provided for example using a milling operation, is recessed into the second surface 100 to accommodate the longer hydraulic unit and provide a first lateral thickness T1. The first lateral thickness T1 is provided between the first surface 98 and the machined surface 114, which are parallel to one another. A second lateral thickness T2 is provided between the first and second surfaces 98, 100. The ratio of the second lateral thickness T2 to the first lateral thickness T1 is 1.05.

Although an example embodiment has been disclosed, a worker of ordinary skill in this art would recognize that certain modifications would come within the scope of the claims. For that reason, the following claims should be studied to determine their true scope and content.

The invention claimed is:

1. A method of assembling an integrated drive generator, comprising steps of:
   providing a bore in a center housing portion that has a surface;
   pressing a bearing liner into the bore, with a portion of the bearing liner extending proud of the surface;
   machining the surface around and adjacent to the bearing liner to provide a machined surface parallel to the surface; and
   machining a recess in an opposite side of the center housing portion to provide a second machined surface, and securing a hydraulic unit to the second machined surface, the hydraulic unit having the shaft.

2. The method according to claim 1, further comprising a step of arranging a seal on the machined surface and sealing the center housing portion relative to another housing portion with the seal plate.

3. A method of assembling an integrated drive generator, comprising the steps of:
   providing a bore in a center housing portion that has a surface;
   pressing a bearing liner into the bore, with a portion of the bearing liner extending proud of a the surface of the center plate;
   machining the surface around and adjacent to the bearing liner to provide a machined surface parallel to the surface;
   securing generator, center and input housing portions to one another, the center housing portion sealed relative to the generator and input housing portions with seal plates, wherein the center housing portion is arranged between the generator and input housing portions, and the seal plates are arranged on opposing sides of and in engagement with the center housing portion;
   mounting a hydraulic unit to the center housing portion; and
   wherein the center housing portion includes first and second parallel surfaces, and the machined surface is parallel to and recessed into one of the first and second surfaces in an area of the hydraulic unit.

4. The method according to claim 3, wherein the hydraulic unit includes a shaft supported by a bearing in the center housing portion, the machined surface surrounding the bearing.

5. The method according to claim 3, wherein the center housing portion is a magnesium alloy.

6. The method according to claim 5, wherein the machined surface is provided by a milled surface.

7. A method of assembling an integrated drive generator, comprising steps of:
   providing a bore in a center housing portion that has a surface;
   pressing a bearing liner into the bore, with a portion of the bearing liner extending proud of the surface;
   machining the surface around and adjacent to the bearing liner to provide a machined surface parallel to the surface;
   securing generator, center and input housing portions to one another, the center housing portion sealed relative to the generator and input housing portions with seal plates;
   mounting a hydraulic unit to the center housing portion; and
   wherein the center housing portion includes first and second parallel surfaces, and the machined surface is parallel to and recessed into one of the first and second surfaces in an area of the hydraulic unit, wherein the hydraulic unit includes a can having a flange secured to the machined surface, the can housing a shaft supported by a bore in the center housing portion.

8. The method according to claim 7, wherein the can houses first and second pumping elements separated by a pump plate and configured to provide a fixed rotational speed to a generator within the housing.

9. The method according to claim 8, wherein a first lateral thickness is provided between the first surface and the machined surface, a second lateral thickness is provided between the first and second surfaces, and a ratio of the second lateral thickness to the first lateral thickness is 1.05.

* * * * *